(12) United States Patent
Bae (10) Patent No.: US 12,139,212 B2
(45) Date of Patent: Nov. 12, 2024

(54) POWER ASSIST CONTROL APPARATUS AND POWER ASSIST CONTROL METHOD

(71) Applicant: HL MANDO CORPORATION, Pyeongtaek-si (KR)

(72) Inventor: Jae Hoon Bae, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 694 days.

(21) Appl. No.: 17/426,750

(22) PCT Filed: Jan. 31, 2020

(86) PCT No.: PCT/KR2020/001527
§ 371 (c)(1),
(2) Date: Jul. 29, 2021

(87) PCT Pub. No.: WO2020/159311
PCT Pub. Date: Aug. 6, 2020

(65) Prior Publication Data
US 2022/0097754 A1 Mar. 31, 2022

(30) Foreign Application Priority Data
Feb. 1, 2019 (KR) .................. 10-2019-0013371

(51) Int. Cl.
*B62D 5/04* (2006.01)
*B62D 5/00* (2006.01)
(Continued)

(52) U.S. Cl.
CPC ............ *B62D 5/046* (2013.01); *B62D 5/008* (2013.01); *B62D 3/04* (2013.01); *B62D 5/0493* (2013.01); *F16H 37/065* (2013.01); *H02P 23/14* (2013.01)

(58) Field of Classification Search
CPC ...... B62D 5/046; B62D 5/008; B62D 5/0493; B62D 5/0424; B62D 5/003; B62D 3/04;
(Continued)

(56) References Cited

U.S. PATENT DOCUMENTS

2009/0173566 A1 7/2009 Ogasawara
2016/0149476 A1 5/2016 Qin et al.

FOREIGN PATENT DOCUMENTS

CN 101480967 A 7/2009
CN 105634225 A 6/2016
(Continued)

OTHER PUBLICATIONS

Office Action issued in corresponding Chinese Patent Application No. 202080012246.4 dated Nov. 1, 2022.
(Continued)

*Primary Examiner* — Hai H Huynh
(74) *Attorney, Agent, or Firm* — Hauptman Ham, LLP (57) ABSTRACT

The present disclosure relates to a power assist control apparatus and a power assist control method. The power assist control apparatus according to the present disclosure comprises: a main motor driven at a first rotation speed; a sub-motor driven at a second rotation speed; and a controller which receives steering information from a steering wheel to calculate a target rotation speed value of an output shaft, and controls the main motor and the sub-motor such that the output shaft is rotated at the target rotation speed.

15 Claims, 5 Drawing Sheets

(51) Int. Cl.
*B62D 3/04* (2006.01)
*F16H 37/06* (2006.01)
*H02P 23/14* (2006.01)

(58) Field of Classification Search
CPC ......... B62D 3/12; F16H 37/065; F16H 37/12; F16H 1/28; H02P 23/14; H02P 5/747; H02P 5/46
USPC ...................................................... 701/41–44
See application file for complete search history.

(56) References Cited

FOREIGN PATENT DOCUMENTS

| | | | | |
|---|---|---|---|---|
| JP | 2003-261045 A | 9/2003 | | |
| JP | 2010-023655 A | 2/2010 | | |
| JP | 2010070037 | * 4/2010 | ............... | B62D 6/00 |
| JP | 2010-155592 A | 7/2010 | | |
| JP | 2011051562 | * 3/2011 | ............... | B62D 6/00 |
| JP | 2012-086594 A | 5/2012 | | |
| JP | 5418056 | * 2/2014 | ............... | B62D 6/00 |
| JP | 2016-111921 A | 6/2016 | | |
| KR | 10-2007-0064978 A | 6/2007 | | |
| KR | 10-1240608 B1 | 3/2013 | | |
| WO | 02/08629 A1 | 10/2002 | | |

OTHER PUBLICATIONS

Office Action issued May 16, 2023 for counterpart Chinese Patent Application No. 202080012246.4.
International Search Report (PCT/ISA/210) issued in PCT Application No. PCT/KR2020/001527 dated May 13, 2020 with English Translation.
Korean language Written Opinion (PCT/ISA/237) issued in PCT Application No. PCT/KR2020/001527 dated May 13, 2020.

* cited by examiner

POWER ASSIST CONTROL APPARATUS AND POWER ASSIST CONTROL METHOD

CROSS-REFERENCE OF RELATED APPLICATIONS

This application is the U.S. National Phase under 35 U.S.C. § 371 of International Patent Application No. PCT/KR2020/001527, filed on Jan. 31, 2020, which claims the benefit of Korean Patent Application No. 10-2019-0013371, filed on Feb. 1, 2019, the entire disclosures of each are incorporated by reference herein.

TECHNICAL FIELD

The disclosure relates to a power assist control device and a power assist control method.

BACKGROUND ART

The steering system of a vehicle is a device for changing the traveling direction of the vehicle at the driver's will to assists the driver to drive the vehicle in the desired direction by arbitrarily changing the center of rotation around the front wheel.

A power steering device is a device that allows the vehicle to change its traveling direction easily with reduced power by assisting in the driver's steering wheel manipulation power using a device providing steering assist power when the driver manipulates the steering wheel.

Such power steering devices are largely divided into hydraulic power steering (HPS) devices and electronic power steering (EPS) devices.

The electronic power steering device is a device that includes a steering motor and an electronic control unit (ECU) in the rack bar or column, instead of a hydraulic pump and an operation cylinder, and supplies steering assist power by the driving of the steering motor.

The aforementioned electronic power steering device may be applied to various vehicles from small to large vehicles. As the size of the vehicle increases, the size or capacity of the steering motor required to steer the vehicle is supposed to increase.

However, since the inertia of a high-capacity steering motor included in a large vehicle is very large, it is difficult for the electronic control unit to quickly and easily control the steering motor.

DETAILED DESCRIPTION OF THE INVENTION

Technical Problem

In light of the background, the disclosure provides a power assist control device and power assist control method, which may easily perform motor control by assisting a main motor with large inertia using a sub-motor with relatively small inertia.

The disclosure also provides a power assist control device and power assist control method, which may assist overall power by supplementing the power of the main motor with the power of the sub-motor although the power of the main motor is reduced by an abnormal operation.

Technical Solution

To achieve the foregoing objectives, according to an embodiment of the disclosure, there is provided a power assist control device, comprising a main motor driven at a first rotation speed, a sub-motor driven at a second rotation speed, and a controller receiving steering information for a steering wheel, calculating a target rotation speed of an output shaft, and controlling the main motor and the sub-motor to allow the output shaft to rotate at the target rotation speed, wherein the controller calculates a first rotation speed smaller than the target rotation speed, outputs, to the main motor, a first control signal instructing to drive the main motor according to the first rotation speed, calculates a second rotation speed not smaller than the target rotation speed, and outputs, to the sub-motor, a second control signal instructing to drive the sub-motor according to the second rotation speed.

According to another embodiment of the disclosure, there is provided a power assist control method, comprising receiving steering information for a steering wheel and calculating a target rotation speed of an output shaft, calculating a first rotation speed smaller than the target rotation speed and outputting, to a main motor, a first control signal instructing to drive the main motor according to the first rotation speed, and calculating a second rotation speed not smaller than the target rotation speed, and outputting, to the sub-motor, a second control signal instructing to drive the sub-motor according to the second rotation speed.

Advantageous Effects

As described above, according to the disclosure, there may be provided a power assist control device and power assist control method, which may easily perform motor control by assisting a main motor with large inertia using a sub-motor with relatively small inertia.

According to the disclosure, there may also be provided a power assist control device and power assist control method, which may assist overall output by supplementing the output of the main motor with the output of the sub-motor although the output of the main motor is reduced by an abnormal operation.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
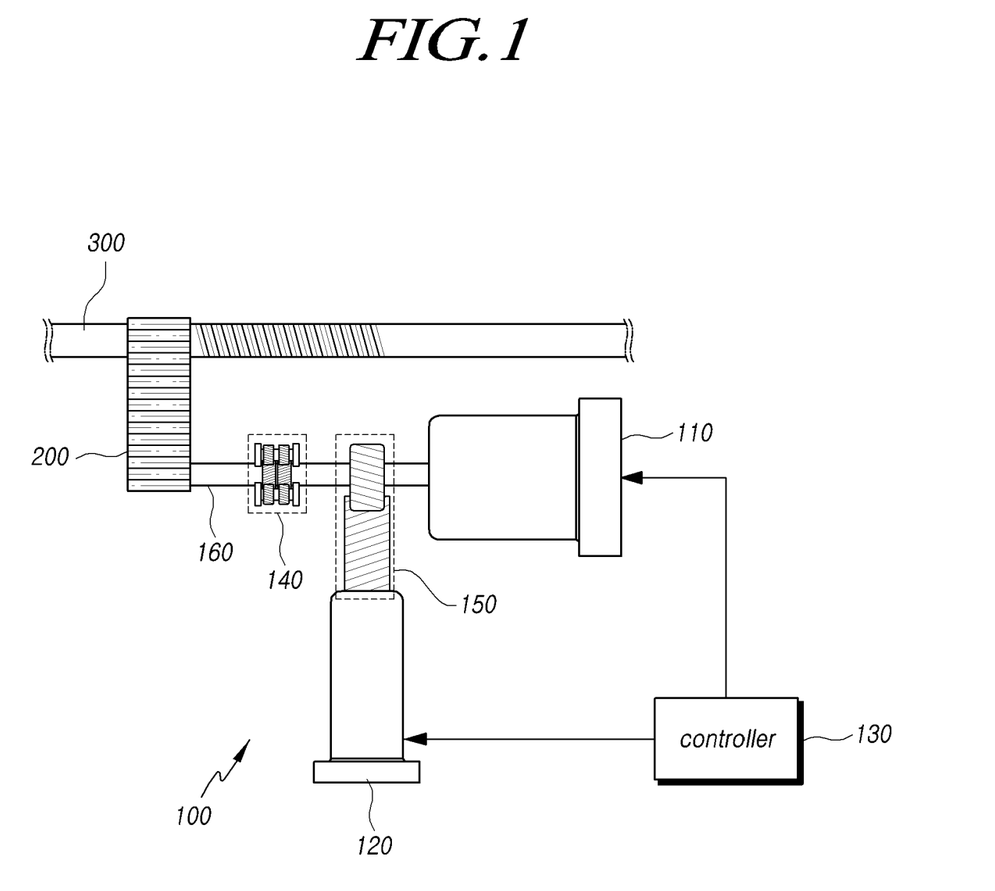
FIG. 1 is a view illustrating a power assist control device according to the disclosure.

FIG. 1 is a view illustrating a power assist control device 100 according to the disclosure.

Referring to FIG. 1, the power assist control device 100 according to the disclosure may mean a device that assists steering of a vehicle according to a driver's manipulation of a steering wheel.

Specifically, the power assist control device 100 may receive input information generated according to the driver's manipulation of the steering wheel, calculate an appropriate control value, and control the steering motor according to the control value. The output generated by the driving of the steering motor corresponds to the rotation force, and the output is transmitted to a rack bar 300 through a belt 200, and the rotation is converted into a linear motion of the rack bar 300, so that the wheels (not shown) coupled to the rack bar 300 may be steered.

To implement the above-described operation, the power assist control device 100 includes a main motor 110, a sub-motor 120, a controller 130, a first decelerator 140, a second decelerator 150, and an output shaft 160.

The main motor 110 is a motor that constitutes the steering motor and mainly contributes to generating the final output transmitted to the rack bar 300.

The main motor 110 may receive a first control signal from the controller 130 and be driven at a first rotation speed indicated by the first control signal.

Here, the first rotation speed may be represented as an angular speed, and may be represented as a revolution per minute (RPM). However, embodiments of the disclosure are not limited thereto.

The capacity of the main motor 110 is preferably very large enough to steer a large vehicle, such as a truck. Preferably, the capacity of the main motor 110 may be configured to be greater than the capacity of the sub-motor 120 to be described below.

Meanwhile, an output generated by driving the main motor 110 may be transmitted to the output shaft 160 through the first decelerator 140.

The sub-motor 120 is a motor that constitutes the steering motor and assists in generating the final output transmitted to the rack bar 300. For example, the sub-motor 120 may be a brushless AC (BLAC). However, embodiments of the disclosure are not limited thereto.

The sub-motor 120 may receive a second control signal from the controller 130 and be driven at a second rotation speed indicated by the second control signal.

Here, the second rotation speed may be represented as, e.g., an angular speed or RPM in the same manner as the first rotation speed. Meanwhile, the second rotation speed may be preferably set to be higher than the first rotation speed.

Meanwhile, an output generated by driving the sub motor 120 may be transmitted to the output shaft 160 through the first decelerator 140 and the second decelerator 150.

The controller 130 may receive steering information for the steering wheel, calculate a target rotation speed of the output shaft 160, and control the main motor 110 and the sub-motor 120 so that the output shaft 160 rotates at the target rotation speed.

Specifically, the controller 130 may receive the steering information for the steering wheel sensed by a sensor, calculate the target rotation speed of the output shaft 160, and output a first control signal to the main motor 110 and a second control signal to the sub-motor 120. For example, the controller 130 may calculate the target rotation speed value of the output shaft 160 using a steering angle and/or a steering torque value received through a steering angle sensor or a torque sensor. Various well-known methods may be adopted for the controller 130 to calculate the target rotation speed.

In this case, the main motor 110 receiving the first control signal may transmit a first output to mainly contribute to rotation of the output shaft 160 at the target rotation speed, and the sub-motor 120 receiving the second control signal may transmit a second output to auxiliarily contribute to rotation of the output shaft 160 at the target rotation speed. Here, the first output may be greater than the second output.

As described above, the steering information for the steering wheel means, e.g., information regarding the steering angle generated by rotation of the steering wheel. Although not shown, the steering information for the steering wheel may be detected by a steering angle sensor.

Here, the target rotation speed may mean a rotation speed for implementing the linear motion of the rack bar 300.

Here, control signals including the first control signal and the second control signal may mean assist currents or assist current values. Here, the assist current or the assist current value means a current to allow each motor in the disclosure to rotate at the target rotation speed. Therefore, in describing the disclosure, for convenience of understanding, indicating a first rotation speed or a second rotation speed to each motor by the controller 130 is referred to as transmitting the first control signal or the second control signal. This may be interpreted as applying a current for setting the rotation speed of each motor to the first rotation speed or the second rotation speed as described above. However, embodiments of the disclosure are not limited thereto.

In an embodiment, the controller 130 may calculate the first rotation speed smaller than the target rotation speed and output the first control signal indicating the first rotation speed to the main motor 110.

In this case, the controller 130 may calculate the first rotation speed based on a first gear ratio of the first decelerator 140 coupled to the main motor 110.

The first decelerator 140 may reduce or increase the first rotation speed of the main motor 110 or the second rotation speed of the sub-motor 120. The first decelerator 140 may be, e.g., a planetary gear.

The planetary gear may include a sun gear, a planet gear, a carrier, and a ring gear. The gear shape of each of the sun gear, planet gear and ring gear may be a helix angle to prevent backlash. However, embodiments of the disclosure are not limited thereto.

The first gear ratio may mean a ratio between the gears included in the first decelerator 140, and if the first reduction gear 140 is a planetary gear, the first gear ratio may be a gear ratio of the planetary gear. In other words, the first gear ratio ($i_1$) of the planetary gear may be determined by [Equation 1] below.

$$i_1 = \frac{z_{is} \times z_{op}}{z_{ip} \times z_{os}}$$ [Equation 1]

In this case, $z_{is}$ is the number of input sun gear teeth, $z_{ip}$ is the number of input planet gear teeth, $z_{os}$ is the number of output sun gear teeth, and $z_{op}$ is the number of output planet gear teeth.

Meanwhile, according to an embodiment, the controller 130 may calculate the second rotation speed equal to or greater than the target rotation speed and output the second control signal indicating the second rotation speed to the sub-motor 120.

In this case, the controller 130 may calculate the second rotation speed based on the first gear ratio of the first decelerator coupled to the main motor 110 and the second gear ratio of the second decelerator 150 coupled to the sub-motor 120, the first decelerator 140, and the output shaft 160.

The first decelerator 140 and the first gear ratio have been described above, and the second decelerator 150 may reduce or increase the second rotation speed of the sub-motor 120.

For example, the first decelerator 140 is a planetary gear, and the second decelerator 150 is a decelerator including a worm gear and a worm wheel gear. In this case, each of the worm gear and the worm wheel gear may be formed of plastic to prevent noise. However, embodiments of the disclosure are not limited thereto.

The second gear ratio may mean a ratio between the gears included in the second decelerator 150. If the first decelerator 140 is a planetary gear, and the second decelerator 150 is a decelerator including a worm gear and a worm wheel gear, the first gear ratio may be a gear ratio of the planetary gear, and the second gear ratio may be a gear ratio between the worm gear axially coupled to one side of the sub-motor 120 and the worm wheel gear engaged with the worm gear. In other words, the second gear ratio ($i_2$) of the planetary gear may be determined by [Equation 2] below.

$$i_2 = \frac{z_{worm}}{z_{wormwheel}}$$ [Equation 2]

In this case, $z_{worm}$ is the number of the teeth of the worm gear, and $z_{wormwheel}$ is the number of the teeth of the worm wheel gear.

Meanwhile, if the first decelerator 140 is a planetary gear and the second decelerator 150 is a decelerator including a worm gear and a worm wheel gear, the controller 130 may calculate the target rotation speed ($\omega_{os}$) of the output shaft 160 using [Equation 3] below.

$$\omega_{os} = (\omega_{mm} \times i_1) + \{\omega_{sm} \times i_2 \times (1 - i_1)\}$$ [Equation 3]

Here, $\omega_{mm}$ is the first rotation speed of the main motor 110, $\omega_{sm}$ is the second rotation speed of the sub-motor 120, $i_1$ is the first gear ratio of the first reduction gear 140, and $i_2$ is the second gear ratio of the second decelerator 150.

The output shaft 160 may transmit the first output of the main motor 110 and the second output of the sub-motor 120 to the rack bar 300 through the belt 200. Specifically, the output shaft 160 may be rotated at the target rotation speed, and the belt 200 coupled to the output shaft 160 may be rotated together, and a nut pulley included in the rack bar 300 rotates, allowing the rack bar 300 to linearly move. Although not shown, the output shaft 160 may include a motor pulley to implement such an operation. Alternatively, the output shaft 160 may be physically connected directly to the rack bar 300 or may be physically connected to the steering shaft to transmit a driving force to the rack bar 300. In other words, the driving force transmitted by the output shaft 160 to the rack bar 300 may be variously implemented according to the EPS type, and is not limited to a specific EPS type.

Although not shown, the disclosure may include a steering angle sensor for detecting the steering angle of the steering wheel, a vehicle speed sensor, a reaction force motor driven to give a feeling of reaction to the driver, a torque sensor for detecting the torque of the reaction force motor, a yaw rate sensor, a position sensor for detecting the position of each of the mainmotor 110 and the sub-motor 120, and a device, e.g., an actuator, necessary to steer the vehicle.

As described above, the power assist control device 100 according to the present disclosure assists the high-capacity main motor 110 using the sub-motor 120 having relatively low inertia, thereby rendering it possible to easily perform motor control.

Figure 2:
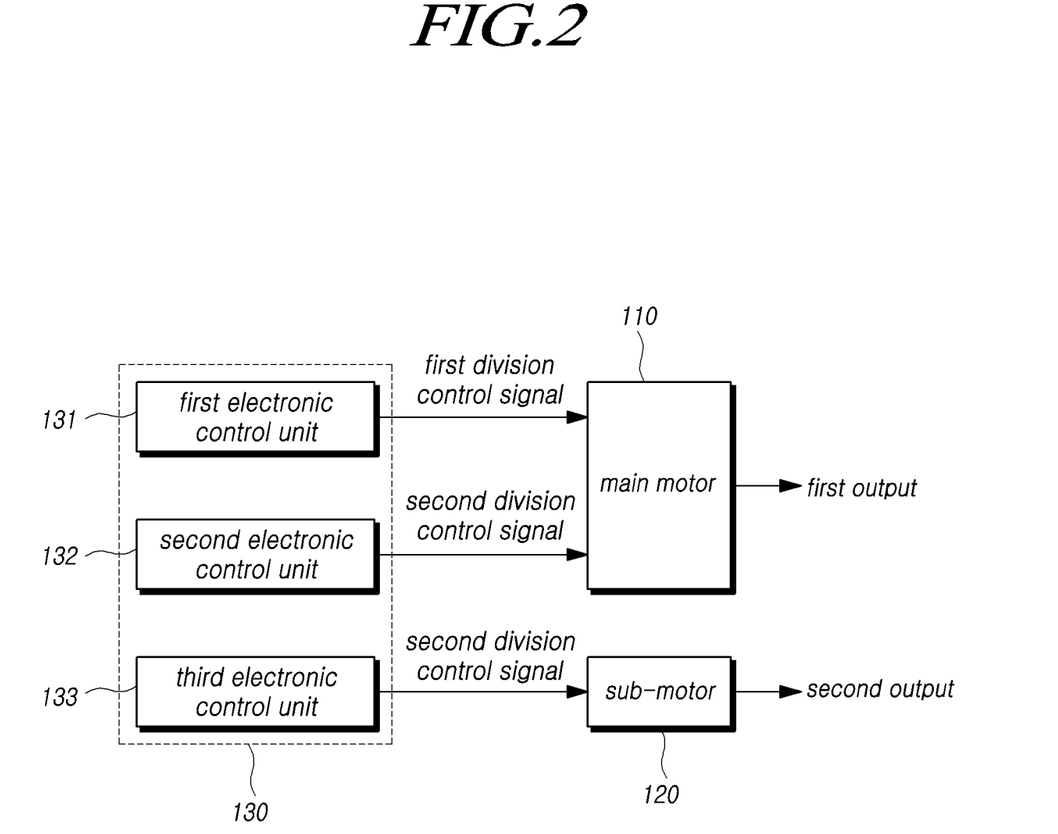
FIG. 2 is a view illustrating an embodiment of a controller according to the disclosure.
Figure 3:
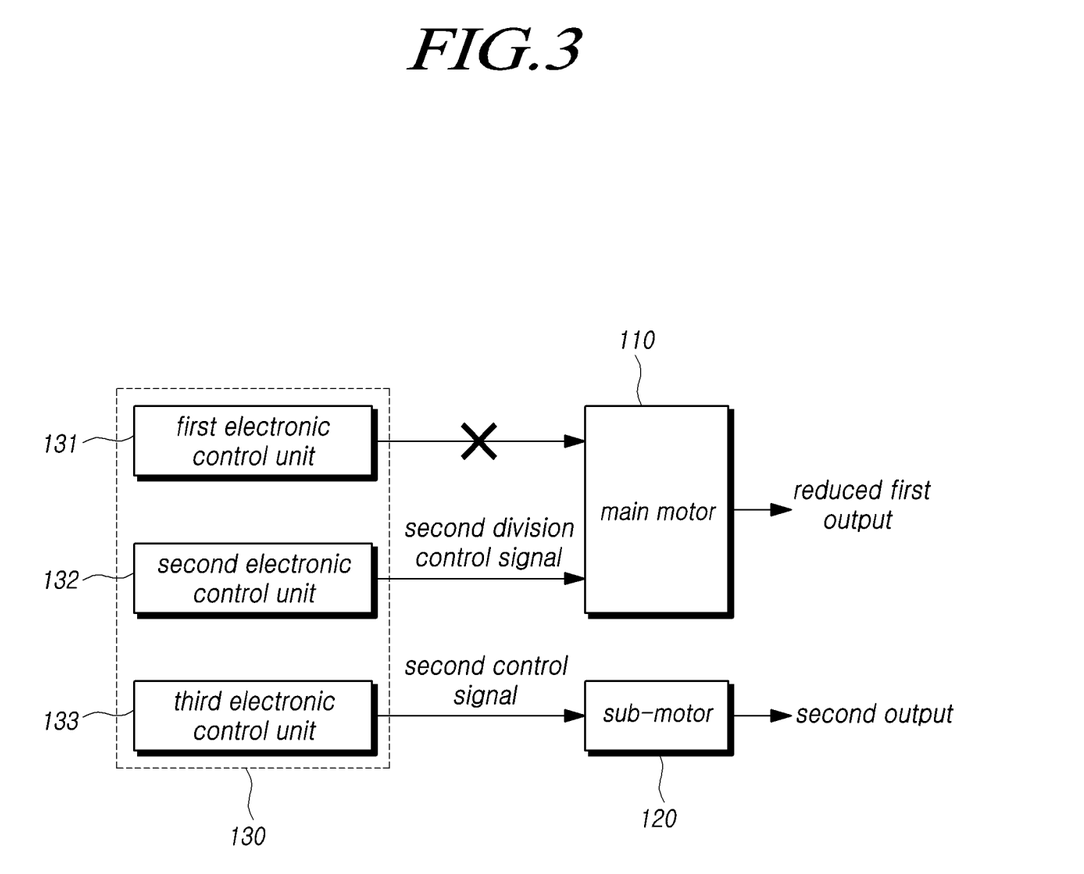
FIG. 3 is a view illustrating another embodiment of a controller according to the disclosure.

FIG. 2 is a view for describing an embodiment of the controller 130 according to the present disclosure, and FIG. 3 is a view for describing another embodiment of the controller 130 according to the present disclosure.

Referring to FIG. 2, the controller 130 included in the power assist control device 100 according to the present disclosure may include two or more electronic control units (ECUs) for outputting a first control signal to the main motor 110 and one or more electronic control units for outputting a second control signal to the sub-motor 120. In this case, each electronic control unit may output a control signal to the main motor 110 and the sub-motor 120.

In the disclosure, for convenience of description, although the embodiment described uses two electronic control units electrically connected to the main motor 110 and one electronic control unit electrically connected to the sub-motor 120, embodiments of the disclosure are not limited thereto.

Referring back to FIG. 2, the controller 130 may include a plurality of electronic control units that individually generate a plurality of division control signals, into which the first control signal has been split, and output the division control signals to the main motor 110.

For example, the controller 130 generates a first electronic control unit 131, which generates a first division control signal and outputs it to the main motor 110, and a second electronic control unit 132, which generates a second division control signal and outputs it to the main motor 110.

Here, the division control signals may be signals into which the control signal has been equally split. Referring to FIG. 2, for example, the first division control signal and the second division control signal are control signals into which the first control signal is split equally by 50%. In other words, the first control signal is the sum of the first division control signal and the first division control signal. However, without limitations thereto, the ratio may be adjusted.

In this case, the main motor 110 may combine the plurality of division control signals individually received from the plurality of electronic control units and may be driven at the first rotation speed.

For example, the main motor 110 receives the first division control signal from the first electronic control unit 131 and the second division control signal from the second electronic control unit 132 and is driven at the first rotation speed based on the first control signal which is a combination of the first division control signal and the second division control signal. In this case, the first output of the main motor 110 is transmitted to the output shaft 160 through the first decelerator 140.

As described above, as the first control signal means an assist current or an assist current value, the two electronic control units may split the assist current value for driving the main motor 110 at the first rotation speed and transmit them to the main motor 110.

The controller 130 may include a third electronic control unit 133 that outputs the second control signal to the sub-motor 120. The second output of the sub-motor 120 is transmitted to the output shaft 160 through the first decelerator 140 and the second decelerator 150.

Meanwhile, the controller 130 may perform a redundant operation using two electronic control units electrically connected to the main motor 110.

Referring to FIG. 3, if an electronic control unit in an abnormal state exists among the plurality of electronic control units, the controller 130 may control the main motor 110 using the remaining electronic control units in a normal state.

For example, when the first electronic control unit 131 is abnormal, if the controller 130 determines that it is impossible to restore to the first control signal when normal, the controller 130 continuously maintains the second division control signal, which corresponds to half the size of the first control signal and outputs it to the main motor 110. In this case, the main motor 110 generates an output corresponding to half of the first output, and the reduced first output is transmitted to the output shaft 160.

Such an occasion where the division control signal fails to be transmitted to the main motor 110 may occur when the first electronic control unit 131 is in an abnormal state as illustrated in FIG. 3 or may arise in other various contexts, e.g., when the second electronic control unit 132 is in an abnormal state or when there is a defect in the windings, connections, or circuitry of the main motor 110.

Meanwhile, the electronic control unit (e.g., the third electronic control unit 133) electrically connected with the sub-motor 120 may be operated independently from the electronic control units (e.g., the first electronic control unit 131 and the second electronic control unit 132) electrically connected with the main motor 110. Accordingly, the reduced first output generated by the main motor 110 and the second output of the sub-motor 120 may be transmitted to the output shaft 160.

As described above, although the output of the main motor 110 is reduced due to an abnormal operation, the controller 130 according to the present disclosure supplements the output with the output of the sub-motor 120, thereby assisting the overall output.

Figure 4:
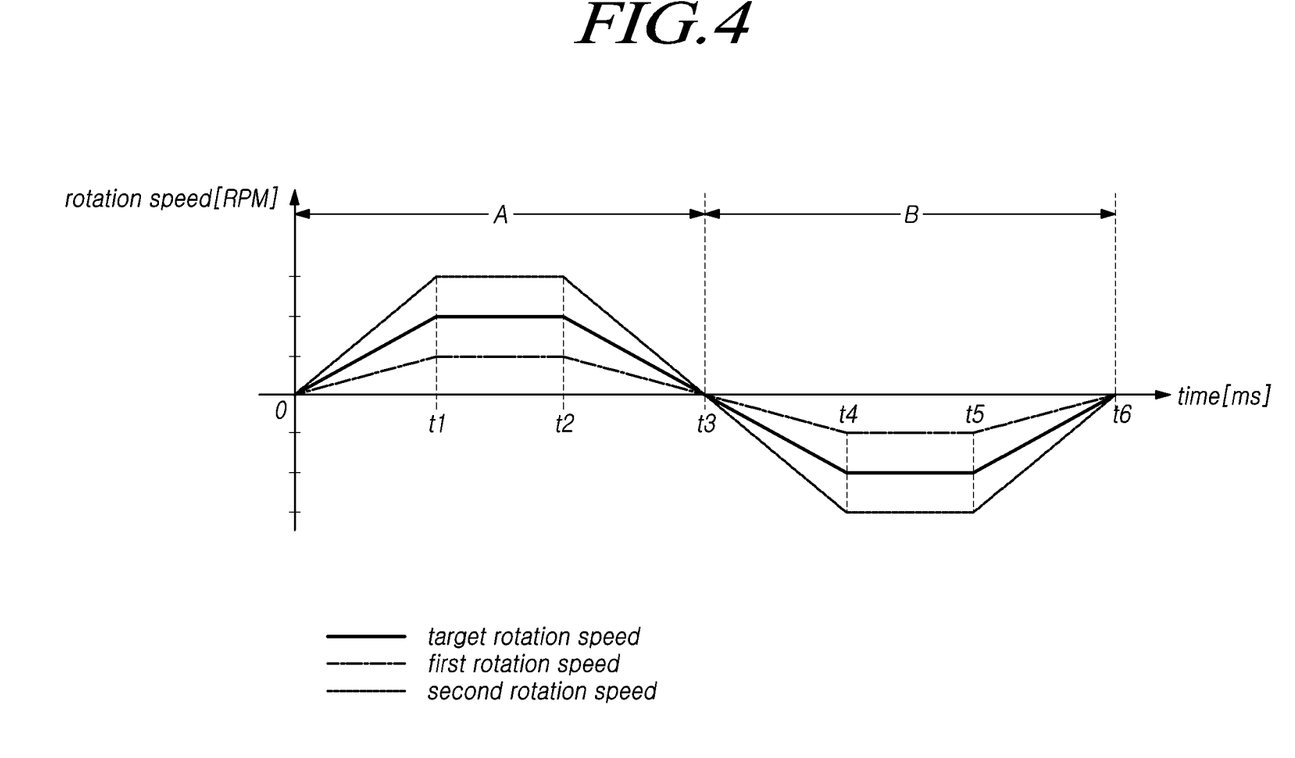
FIG. 4 is a graph illustrating a rotation speed according to steering information for a steering wheel according to the disclosure.

FIG. 4 is a graph illustrating a rotation speed according to steering information for a steering wheel according to the disclosure.

Referring to FIG. 4, the power assist device 100 according to the present disclosure may calculate a target rotation speed required to assist in steering of the vehicle according to a rotation direction and steering angle of the steering wheel and control the rotation speed of each of the main motor 110 and the sub-motor 120 to allow the output axis 160 to rotate at the target rotation speed.

Period A is a period for the rotation speeds of the main motor 110, the sub-motor, and the output shaft 160 when the steering wheel is in a first rotation direction, and period B is a period for the rotation speeds of the main motor 110, the sub-motor, and the output shaft 160 when the steering wheel is in a second rotation direction.

For example, period A is a period for the rotation speeds when the rotation direction is clockwise, and period B is a period for the rotation speeds when the rotation direction of the steering wheel is counterclockwise. However, without limitations thereto, the opposite may be applied.

The steering of the vehicle in period A is described. The interval between 0 and t1 means an interval during which the rotation speed increases to a first target rotation speed. In this case, since the first rotation speed of the main motor 110 is smaller than the first target rotation speed, the increment in the first rotation speed is smaller than the increment in the first target rotation speed in the same interval. Since the second rotation speed of the sub-motor 120 is equal to or more than the first target rotation speed, the increment in the second rotation speed is larger than the increment in the first target rotation speed in the same interval.

The interval between t1 and t2 means an interval during which the rotation speed is maintained to steer the vehicle in the first rotation direction according to the first target rotation speed.

The interval between t2 and t3 means an interval where the rotation speed starts to decrease to reach the newly calculated first target rotation speed to steer the vehicle from the first rotation direction to the second rotation direction. The decrement in the first rotation speed is smaller than the decrement in the first target rotation speed, and the decrement in the second rotation speed is larger than the decrement in the first target rotation speed.

The steering of the vehicle in period B is described. The interval between t3 and t4 means an interval during which the rotation speed increases to a target rotation speed different from the target rotation speed in period A. In this case, the increment in the first rotation speed is smaller than the increment in the target rotation speed in the same interval, and the increment in the second rotation speed is larger than the increment in the target rotation speed in the same interval.

The interval between t4 and t5 means an interval during which the rotation speed is maintained to steer the vehicle in the second rotation direction according to the calculated target rotation speed.

The interval between t5 and t6 means an interval where the rotation speed starts to decrease to reach the newly calculated target rotation speed to steer the vehicle from the second rotation direction to the first rotation direction. The decrement in the first rotation speed is smaller than the decrement in the first target rotation speed, and the decrement in the second rotation speed is larger than the decrement in the first target rotation speed.

As described above, the disclosure reduces the rotation speed of the main motor 110 having a significantly high capacity and increases the rotation speed of the sub-motor 120 having a smaller capacity than the main motor 110, thereby rendering it possible to easily perform steering control for the vehicle.

Figure 5:
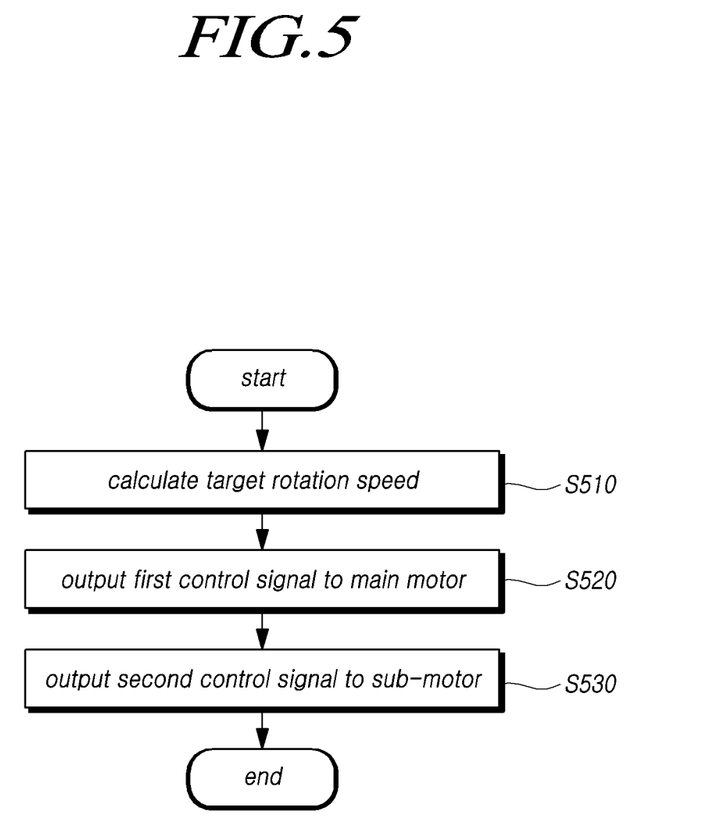
FIG. 5 is a flowchart illustrating a power assist control method according to the disclosure.

FIG. 5 is a flowchart illustrating a power assist control method according to the disclosure.

Referring to FIG. 5, in step S510, steering information for the steering wheel is received, and a target rotation speed of the output shaft 160 may be calculated.

For example, the controller 130 calculates the target rotation speed of the output shaft 160 by substituting the first gear ratio of the first decelerator 140, the second gear ratio of the second decelerator 150, the first rotation speed of the main motor 110, and the second rotation speed of the sub-motor 120 in Equation 3 above.

In step S520, the first rotation speed smaller than the target rotation speed may be calculated, and the first control signal indicating the first rotation speed may be output to the main motor 110.

In step S520 of outputting the first control signal to the main motor 110, the first rotation speed may be calculated based on the first gear ratio of the first decelerator 140 coupled to the main motor 110.

For example, the first electronic control unit 131 and the second electronic control unit 132 included in the controller 130 calculate the first rotation speed based on the first gear ratio of the planetary gear and output the first control signal to the main motor 110.

Step S530 may include calculating the second rotation speed which is equal to or larger than the target rotation speed and outputting the second control signal indicating the second rotation speed to the sub-motor 120.

In step S530 of outputting the second control signal to the sub-motor 120, the second rotation speed may be calculated based on the first gear ratio of the first decelerator coupled to the main motor 110 and the second gear ratio of the second decelerator 150 coupled to the sub-motor 120, the first decelerator 140, and the output shaft 160.

For example, the third electronic control unit 133 included in the controller 130 calculates the second rotation speed based on the first gear ratio of the planetary gear and the second gear ratio of the decelerator including the worm gear and the worm wheel gear and outputs the second control signal to the sub-motor 120.

As described above, according to the disclosure, there may be provided a power assist control device and power assist control method, which may easily perform motor control by assisting the main motor 110 with large inertia using the sub-motor 120 with relatively small inertia.

According to the disclosure, there may also be provided a power assist control device and power assist control method, which may assist overall output by supplementing the output of the main motor 110 with the output of the sub-motor 120 although the output of the main motor 110 is reduced due to an abnormal operation.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

LEGEND OF REFERENCE NUMERALS

100: power assist control device 110: main motor
120: sub-motor 130: controller
131: first electronic control unit 132: second electronic control unit
133: third electronic control unit 140: first decelerator
150: second decelerator 160: output shaft
200: belt 300: rack bar

CROSS-REFERENCE TO RELATED APPLICATION(S)

This application claims priority, under 35 U.S.C. 119(a), to Korean Patent Application No. 10-2019-0013371 filed in the Korean Intellectual Property Office on Feb. 1, 2019, the disclosure of which is incorporated by reference herein in its entirety.

The invention claimed is:

1. A power assist control device, comprising:
a main motor driven at a first rotation speed;
a sub-motor driven at a second rotation speed; and
a controller receiving steering information for a steering wheel, calculating a target rotation speed of an output shaft, and controlling the main motor and the sub-motor to allow the output shaft to rotate at the target rotation speed,
wherein the controller:
calculates a first rotation speed smaller than the target rotation speed, outputs, to the main motor, a first control signal instructing to drive the main motor according to the first rotation speed; and
calculates a second rotation speed not smaller than the target rotation speed, and outputs, to the sub-motor, a second control signal instructing to drive the sub-motor according to the second rotation speed, and
wherein the controller calculates the first rotation speed based on a first gear ratio of a first decelerator coupled to the main motor.

2. The power assist control device of claim 1, wherein the first gear ratio is a gear ratio of a planetary gear.

3. The power assist control device of claim 1, wherein the first control signal is an assist current value instructing to drive the main motor according to the first rotation speed, and the second control signal is an assist current value instructing to drive the sub-motor according to the second rotation speed.

4. The power assist control device of claim 3, wherein the controller includes a plurality of electronic control units individually generating a plurality of division control signals, into which the first control signal is split, and individually outputting the plurality of division control signals to the main motor, and
wherein the main motor is driven at the first rotation speed resultant from summating the plurality of division control signals individually received from the plurality of electronic control units.

5. The power assist control device of claim 4, wherein in response to an electronic control unit in an abnormal state existing among the plurality of electronic control units, the controller controls the main motor using remaining electronic control units in a normal state.

6. The power assist control device of claim 5, wherein the first gear ratio is a gear ratio of a planetary gear, and wherein the second gear ratio is a gear ratio between a worm gear axially coupled to a side of the sub-motor and a worm wheel gear engaged and coupled to the worm gear.

7. The power assist control device of claim 1, wherein the controller calculates the second rotation speed based on the first gear ratio of the first decelerator coupled to the main motor and a second gear ratio of a second decelerator coupled to the sub-motor, the first decelerator, and the output shaft.

8. The power assist control device of claim 1, wherein a capacity of the main motor is larger than a capacity of the sub-motor.

9. A power assist control method, comprising:
receiving steering information for a steering wheel and calculating a target rotation speed of an output shaft;
calculating a first rotation speed smaller than the target rotation speed and outputting, to a main motor, a first control signal instructing to drive the main motor according to the first rotation speed; and
calculating a second rotation speed not smaller than the target rotation speed, and outputting, to a sub-motor, a second control signal instructing to drive the sub-motor according to the second rotation speed,
wherein outputting the first control signal to the main motor calculates the first rotation speed based on a first gear ratio of a first decelerator coupled to the main motor.

10. The power assist control method of claim 9, wherein the first gear ratio is a gear ratio of a planetary gear.

11. The power assist control method of claim 9, wherein the first control signal is an assist current value instructing to drive the main motor according to the first rotation speed, and the second control signal is an assist current value instructing to drive the sub-motor according to the second rotation speed.

12. The power assist control method of claim 9, wherein outputting the second control signal to the sub-motor calculates the second rotation speed based on the first gear ratio of the first decelerator coupled to the main motor and a second gear ratio of a second decelerator coupled to the sub-motor, the first decelerator, and the output shaft.

13. The power assist control method of claim 12, wherein the first gear ratio is a gear ratio of a planetary gear, and wherein the second gear ratio is a gear ratio between a worm gear axially coupled to a side of the sub-motor and a worm wheel gear engaged and coupled to the worm gear.

14. The power assist control method of claim 9, wherein a capacity of the main motor is larger than a capacity of the sub-motor.

15. A power assist control device, comprising:
a main motor driven at a first rotation speed;
a sub-motor driven at a second rotation speed; and
a controller receiving steering information for a steering wheel, calculating a target rotation speed of an output shaft, and controlling the main motor and the sub-motor to allow the output shaft to rotate at the target rotation speed,
wherein the controller:
calculates a first rotation speed smaller than the target rotation speed, outputs, to the main motor, a first control signal instructing to drive the main motor according to the first rotation speed; and
calculates a second rotation speed not smaller than the target rotation speed, and outputs, to the sub-motor, a second control signal instructing to drive the sub-motor according to the second rotation speed, and
wherein the controller calculates the second rotation speed based on a first gear ratio of a first decelerator coupled to the main motor and a second gear ratio of a second decelerator coupled to the sub-motor, the first decelerator, and the output shaft.

* * * * *